United States Patent
Hartlmeier

(10) Patent No.: US 8,317,509 B2
(45) Date of Patent: Nov. 27, 2012

(54) TWO-SHOT, FOUR STATION INJECTION MOLD

(75) Inventor: Brian Hartlmeier, Elm Grove, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 1514 days.

(21) Appl. No.: 11/358,639

(22) Filed: Feb. 21, 2006

(65) Prior Publication Data

US 2007/0194494 A1    Aug. 23, 2007

(51) Int. Cl.
*B29C 35/00* (2006.01)
(52) U.S. Cl. .......................................... 425/552
(58) Field of Classification Search ............... 264/297.3, 264/297.8, 328.11; 425/552
See application file for complete search history.

(56) References Cited

U.S. PATENT DOCUMENTS

| | | | |
|---|---|---|---|
| 4,330,257 A * | 5/1982 | Rees et al. .................... | 425/556 |
| 4,786,455 A | 11/1988 | Krishnakumar et al. | |
| 5,518,392 A | 5/1996 | Tate et al. | |
| 5,705,112 A | 1/1998 | Gram | |
| 5,750,162 A * | 5/1998 | Schad et al. .................. | 425/533 |
| 6,139,305 A | 10/2000 | Nesch | |
| 6,321,272 B1 | 11/2001 | Swales | |
| 6,386,849 B1 | 5/2002 | Kroeger et al. | |
| 6,587,884 B1 | 7/2003 | Papadopoulos et al. | |
| 6,652,262 B2 | 11/2003 | Kroeger | |
| 6,709,251 B2 | 3/2004 | Payette et al. | |
| 6,714,977 B1 | 3/2004 | Fowler et al. | |
| 6,732,191 B1 | 5/2004 | Baker et al. | |
| 6,783,346 B2 | 8/2004 | Bodmer et al. | |
| 6,787,094 B2 | 9/2004 | Collette et al. | |
| 6,790,027 B1 * | 9/2004 | Callen et al. .................. | 425/556 |
| 6,821,100 B2 | 11/2004 | Kroeger et al. | |
| 2004/0033287 A1 | 2/2004 | Gram | |
| 2004/0119200 A1 | 6/2004 | Gram | |
| 2004/0124558 A1 | 7/2004 | Gram | |

* cited by examiner

*Primary Examiner* — Larry Thrower
(74) *Attorney, Agent, or Firm* — Boyle Fredrickson, S.C.

(57) ABSTRACT

A two-shot molding system with four independent molding positions at ninety degree intervals allow injection of the first shot, injection of the second shot, cooling, and ejection of the product to occur simultaneously while the mold is closed. Thus, the invention decreases cycle time, increases throughput, and allows for adequate cooling time without delaying injection and ejection.

20 Claims, 3 Drawing Sheets

TWO-SHOT, FOUR STATION INJECTION MOLD

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to injection molding machines and methods and, in particular, to an injection molding system that allows for injecting, cooling, and ejecting plastic components in multi-shot injection molding of multicolored or multi-material parts.

Injection molding is a manufacturing process in which heated thermoplastic is forced under pressure into a mold. After the thermoplastic cools, the mold is separated along a part line and a molded thermoplastic part is ejected. With the proper mold, complex parts can be manufactured in extremely high volumes and low per-piece costs.

Many products that cannot be manufactured by injection molding in a single mold can be assembled from one or more separately molded parts. The step of assembling these parts can significantly increase the cost of the product and in certain cases decrease part volumes otherwise obtainable.

For this reason, there is considerable interest in so-called "in-mold" assembly techniques. In one such technique termed "two-shot" molding, a mold having replaceable portions allows different features to be added into one changing mold cavity over several sequential steps of plastic injection. The resulting product may be a single, fused structure or, by making the two shots of plastics that resist adhesion to each other, the resulting product may be an assembled collection of movable parts.

In conventional two-shot molding, portions of the mold are rotated. To produce a two-shot plastic part, first one shot of material is injected into a portion of the mold at a first molding station, the mold then opens and rotates portions of the mold 180° carrying parts to a second molding station, and the mold closes again. A second shot is then injected around the first shot at the second molding station to create a plastic part with two colors or materials. Simultaneously, the first shot is injected again at the first molding station. When the mold opens this time, the complete part is ejected at the second molding station. The mold will then rotate and close to repeat the cycle again. The rotary mold technique permits parallel simultaneous injection at the first and second molding stations of both shots. This results in relatively short cycle times, so that production is optimized.

To further reduce cycle times, it is known to permit simultaneous injecting and ejecting of plastic components, as described in U.S. Pat. No. 6,790,027 assigned to the assignee of the present invention and incorporated herein by reference. This injection mold provides a three-position, rotary indexing plate assembly which permits simultaneous injecting and ejecting of plastic components. The three stations of injection positions and ejection position are spaced apart in 120° increments and are in a plane perpendicular to the axis along which the molds separate. Core pins, forming the movable part of the molds, rotate along an axis parallel to the separation axis of the molds are also spaced apart in 120° increments and are in the same plane as the mold and ejection positions and rotate to carry parts between the mold positions.

This molding technique allowing simultaneous two-shot injecting and ejecting provides only limited cooling in between the time of the second injection until the ejection of the finished product as determined by the time it takes to open the mold, rotate the parts carriers, and close the mold. If additional cooling time is required, the ejection may be delayed until after injection of the subsequent first and second shots, but this negatively impacts cycle time, hence throughput and production efficiency.

A significant limitation to this technique described above of multi-station multi-shot injection, is that increasing the number of parts carriers required a significant increase in the mold size. Conventional injection molding machines may not be large enough to house such a mold and may not exert enough pressure on such a mold.

SUMMARY OF THE INVENTION

The present inventors have realized that for some molded items, additional molding stations and core pins can be accommodated without unduly increasing press size, by rotating the core pins perpendicularly to the axis of mold separation through four positions and by injecting at two successive molding stations separated by 90°. The third molding station can then be used for cooling and the fourth molding station will be advantageously positioned for ejection. Press area is more efficiently used.

Specifically, the present invention provides an injection molding system having a turret supporting parts carriers at 90-degree intervals about a longitudinal axis. A first and second mold portion close together along a transverse axis substantially perpendicular to the longitudinal axis to interfit around the turret when the turret is rotated to any of four positions. At each of the four positions, the first and second mold portions interfit with at least two parts carriers on the turret separated by 90 degrees to form corresponding first and second molding cavities for receiving injected plastic.

At least one part carrier at each of the four positions may be received by a cooling cavity in at least one of the first and second mold portions.

Thus, it is one object of at least one embodiment of the invention to provide a molding system that may cool parts at the same time the plastic is injected.

The cooling cavity may provide channels for circulating cooling medium.

Thus, it is one object of at least one embodiment of the invention to provide a cooling cavity that may have a cooling medium circulating through it in order to cool the parts and/or the molding system.

At least one part carrier at each of the four positions may be exposed outside of the first and second mold portions.

Thus, it is one object of at least one embodiment of the invention to provide a position where the parts may be ejected at the same time the plastic is injected.

A parts extractor may engage and remove at least one part on a part carrier at each of the four positions of the parts carrier at which the part carrier is exposed outside of the first and second mold portions.

Thus, it is one object of at least one embodiment of the invention to allow the parts to be removed by a parts extractor.

At least one parts carrier at each of the four positions may be received by a cooling cavity and at least one parts carrier at each of the four positions may be exposed outside of the first and second mold portions for ejection.

Thus, it is one object of at least one embodiment of the invention to allow for simultaneous cooling, plastic injection, and ejection, the latter, free from interference with mold structure.

The first molding cavity may be formed within the first mold portion only while the second molding cavity may be formed within the first and second mold portions.

Thus, it is one object of at least one embodiment of the invention to provide two different station of molding with only a 90-degree separation along an axis perpendicular to the separation of the molds.

The turret may support a plurality of parts carriers spaced about a longitudinal axis at 90-degree intervals.

Thus, it is one object of at least one embodiment of the invention to allow multiple parts to be molded at each station.

The parts carriers may be pins.

Thus, it is one object of at least one embodiment of the invention to provide pins that form the inner portion of a part.

A first and second runner for transporting plastic may be formed in the mold portions. The first runner may connect to the first molding cavity and the second runner path may connect to the second molding cavity.

Thus, it is one object of at least one embodiment of the invention to provide runner paths for transporting plastic to the molding cavities required by the present invention.

A second turret may support parts carriers spaced at 90-degree intervals about a longitudinal axis. The longitudinal axis of the second turret may be parallel to the longitudinal axis of the first turret. The first and second mold portions may close together along a transverse axis substantially perpendicular to the longitudinal axis of the second turret to interfit around the second turret when the second turret is rotated to any of four positions. At each of the four positions of the second turret, the mold portions may interfit with at least two parts carriers on the second turret separated by 90 degrees to form corresponding third and fourth molding cavities for receiving injected plastic.

Thus, it is one object of at least one embodiment of the invention to provide increased production efficiencies.

The direction of rotation of the first turret may be opposite to the direction of rotation of the second turret.

It is thus an object of at least one embodiment of the invention to provide symmetrical mold portions, simplifying the construction of runners.

A first runner for transporting plastic may connect to the first and third molding cavities and a second runner for transporting plastic may connect to the second and fourth molding cavities.

Thus, it is one object of at least one embodiment of the invention to minimize the number of runners and injection nozzles needed to transport plastic to the molding cavities.

At least two parts carriers of the first and second turrets may be received by cooling cavities in at least one of the first and second mold portions at each of the four turret positions. The cooling cavities may be in the same mold portion.

Thus, it is one object of at least one embodiment of the invention to cool the parts and/or molding apparatus of both turrets. Additionally, it is another object of at least on embodiment of the invention to simplify the cooling structure and provide enhanced cooling properties and possibly thermal balance.

At least two parts carriers may be exposed on opposite sides of the first and second mold portions outside of the first and second mold portions at each of the four turret positions.

Thus, it is one object of at least one embodiment of the invention to maximize the number of parts exposed outside the mold portions for ejection.

The parts carriers may be threaded, the first molding cavity may form an inner portion of a twist-on wire connector, and the second molding cavity may form an outer gripping surface of the twist-on wire connector.

Thus, it is one object of at least one embodiment of the invention to provide a mold system that particularly suited to twist-on wire connectors and similar components that have at least one component that may be molded with a two part mold cavity consisting of a core pin and surrounding mold block.

These particular objects and advantages may apply to only some embodiments falling within the claims and thus do not define the scope of the invention.

BRIEF DESCRIPTION OF THE DRAWINGS

The invention will become better understood by reference to the following detailed description of the preferred exemplary embodiment when read in conjunction with the appended drawings, wherein like numerals denote like elements and.

DETAILED DESCRIPTION OF THE PREFERRED EMBODIMENT

Figure 1:
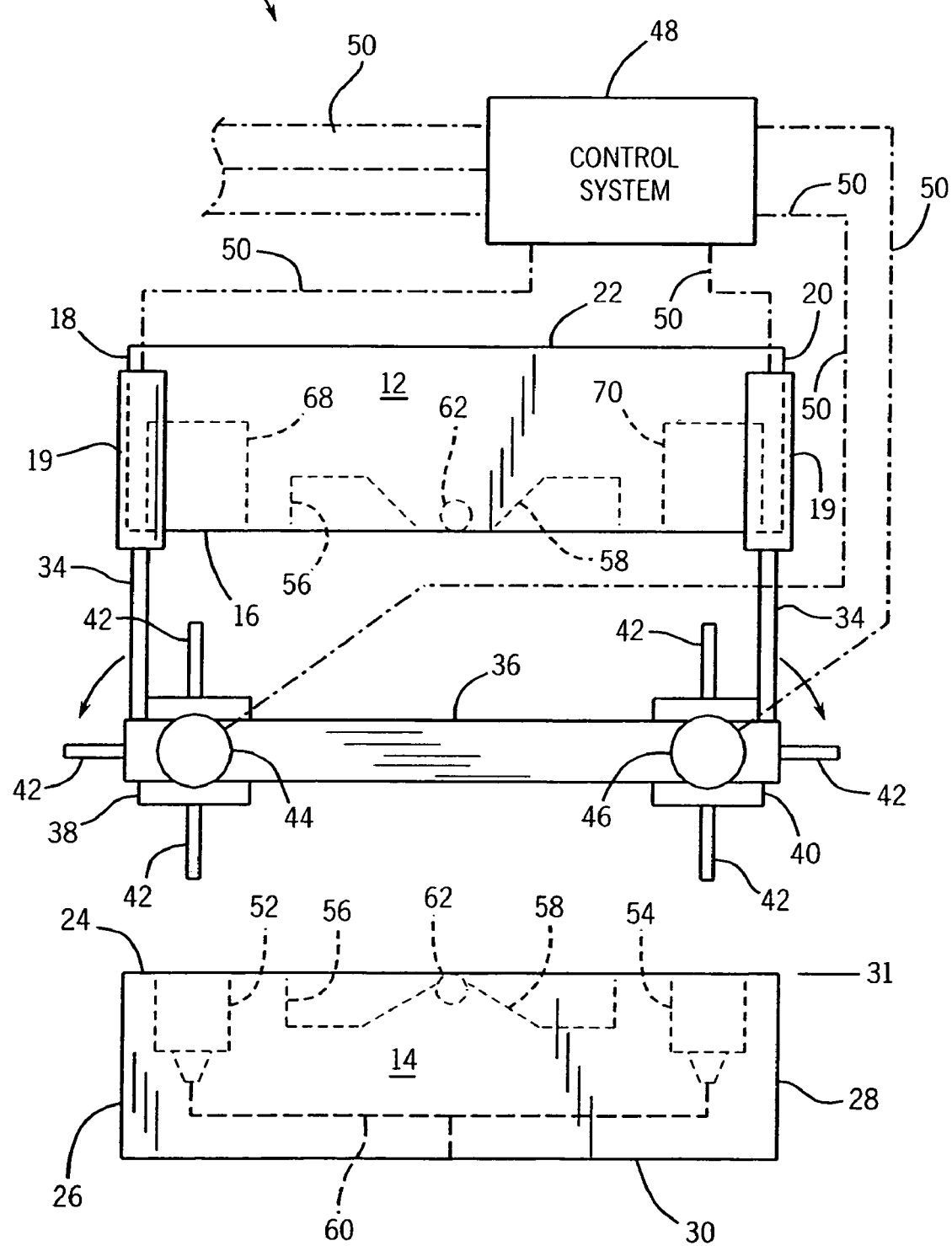
FIG. 1 is an top plan view of an injection molding system having two mold portions and two turrets in accordance with an embodiment of the invention.
Figure 2:
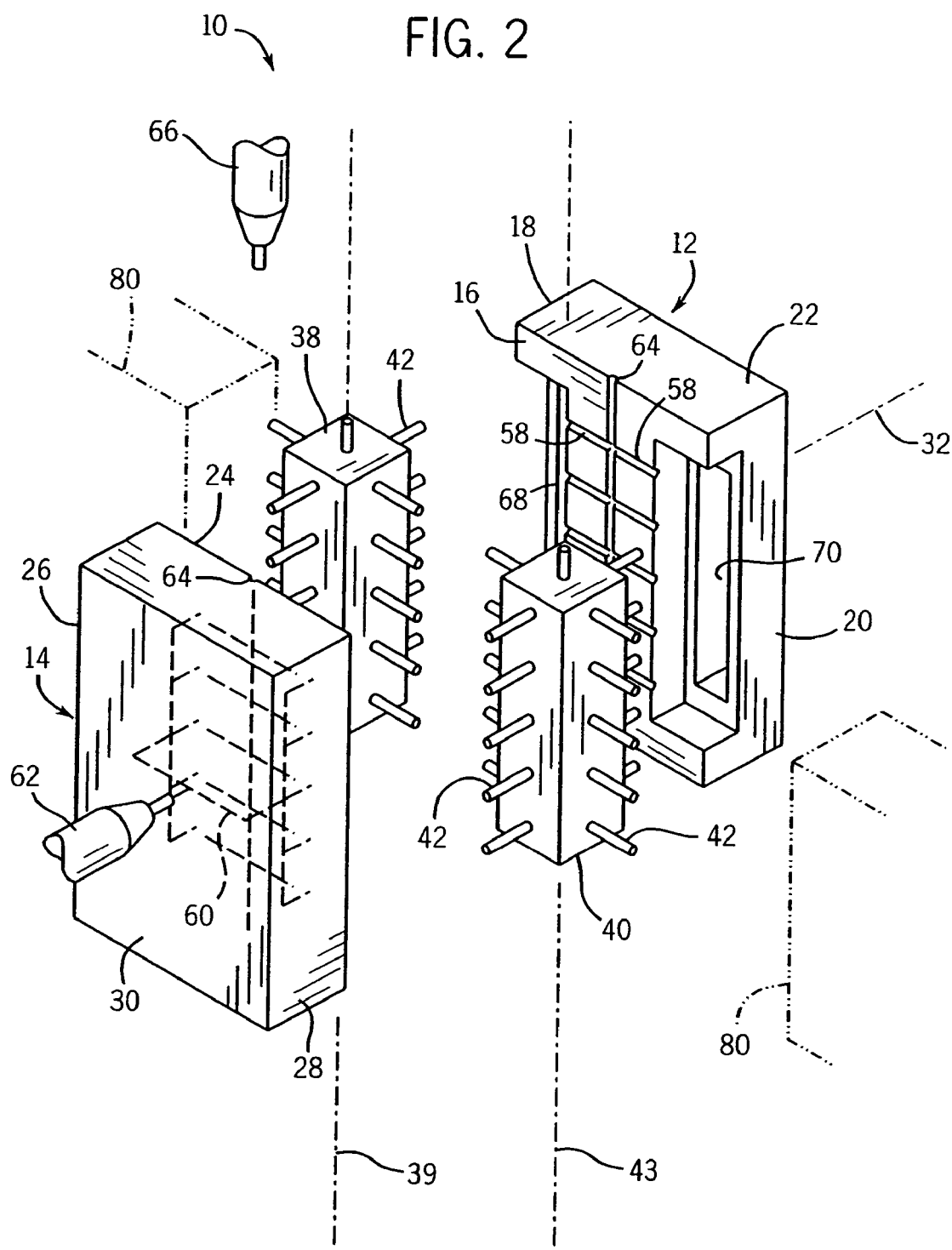
FIG. 2 is a perspective view of the injection molding system of FIG. 1, showing positioning of two injection nozzles in accordance with an embodiment of the invention with turret supporting structure removed for clarity.

Referring now to FIGS. 1 and 2, the injection molding system 10 of the present invention includes a mold portion 12 and mold portion 14. The mold portion 12 has a cavity side 16, a left side 18, a right side 20, and a rear side 22. The mold portion 14 has a cavity side 24, a left side 26, a right side 28, and rear side 30.

Generally, the cavity side 16 of mold portion 12 and the cavity side 24 of mold portion 14 close together along a transverse axis of separation 32 as supported by tie rods (not shown) according to methods well known in the art.

In the present invention, the mold portion 12 may be connected to a set of push rods 34 extending from hydraulic cylinders 19 attached to the mold portion 12 (or other stationary structure) and extending to attach to an upper turret support bar 36. A similar structure is positioned below the mold portion 12 to support a lower turret support bar (not shown).

The turret support bars hold a left turret 38 rotatable about a vertical axis 39 and a right turret 40 rotatable about a vertical axis 43 as driven by hydraulic motors 44 and 46 respectively. Both turrets 38 and 40 support core pins 42 extending radially from the vertical axes 39 and 40 at 90 degree intervals about the vertical axes 39 and 40. These core pins 42 are duplicated in vertical rows at each angle extending along the axes 39 and 40. Importantly, the transverse axis of separation 32 of the mold portions 12 and 14 is perpendicular to the vertical axes of left turret 38 and right turret 40.

A control system 48 is connected by a plurality of control signal lines 50 to the push rods 34 and to the motors 44 and 46 as well as to the other components of the injection molding system 10 to coordinate movement of the turrets 38 and 40 in rotation and translation toward and away from the mold portion 12 as will be described below.

Figure 3:
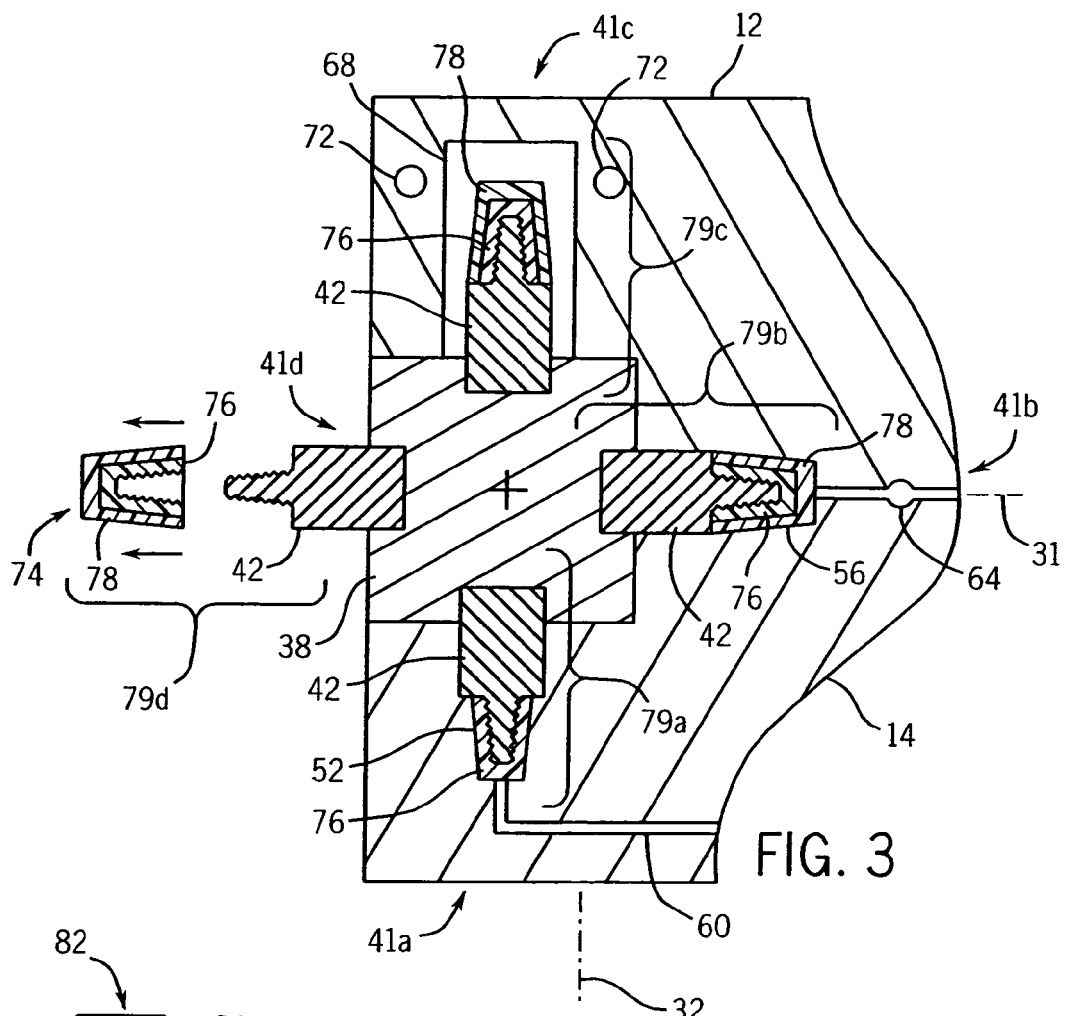
FIG. 3 shows a cross section along a horizontal plane through the injection molding system of FIGS. 1 and 2, when the mold portions are in the closed position.

Referring now to FIG. 3, the left turret 38 and right turret 40 may be incrementally moved to any of four rotation positions 41a, 41b, 41c, 41d, each separated by 90 degrees. At each of these positions 41, two core pins 42 (at positions 41a and 41c as shown) will be perpendicular to the transverse axis of separation 32 to lie along a part line between the stationary mold portions 16 and the mold portion 14, while two core pins 42 (at positions 41b and 41d as shown) will extend into the mold portion 12 and mold portion 14 respectively aligned with the transverse axis of separation 32.

Referring again to FIG. 1, in any one of these positions 41, the first mold portion 12 and second mold portion 14 interfit around the left turret 38 and right turret 40 and with core pins 42 to form molding cavities for receiving injected plastic. A set of left first molding cavities 52 and a plurality of right first molding cavities 54 are formed completely within mold portion 14 corresponding to the core pins 42 at positions 41a on turrets 38 and 40 respectively. A plurality of left second molding cavities 56 and a plurality of right second molding cavities 58 are formed within both mold portion 14 and stationary mold portion 12 corresponding to the core pins 42 at positions 41c on turrets 38 and 40 respectively.

Referring also to FIG. 2, a first runner path 60 in mold portion 14 transports material from a first injector nozzle 62 positioned behind the movable mold portion and generally aligned with transverse the axis of separation 32 to left first molding cavities 52 and right first molding cavities 54. A second runner path 64 formed at the interface of the mold portion 14 and mold portion 12 transports material from a second injector nozzle 66 to left second molding cavities 56 and right second molding cavities 58.

Referring still to FIGS. 1 and 2, a left cooling cavity 68 and a right cooling cavity 70 are formed within stationary mold portion 12. The cooling cavities may also be formed in both of the mold portions. In one embodiment of the invention, channel(s) 72 formed within mold portion 12 circulate a cooling medium through the mold portion 12 to aid cooling. A cooling medium may also be circulated through the cooling cavities to aid cooling.

Referring again to FIG. 3, in one embodiment of the invention, two-shot twist-on wire connectors 74 may be produced having an inner threaded portion 76 of a relative hard plastic material intended to thread onto and twist wire conductors together and an outer grip portion 78 surrounding the inner threaded portion 76 of an elastomeric material intended to provide an improved gripping surface. For this purpose, the core pins 42 have threaded tips defining the threads on the inner threaded portion 76

The twist-on wire connectors 74 are produced in four steps corresponding to four molding stations 79a, 79b, 79c, and 79d defined when the mold portions 12 and 14 are closed along an axis of separation 31. The first molding station 79a is formed by core pins 42 inside of first molding cavities 52 and 54. The inner portions 76 of the wire-twist-on wire connectors 74 are injected at the first molding station 79a. Because the core pins 42 must be able to remove the inner portions 76 of the twist-on wire connectors from the unitary molding cavities, sufficient relief must be incorporated into the outer surface of the inner portions 76 of the twist-on wire connectors to allow the molded parts to be withdrawn axially.

The second molding station 79b is formed by core pins 42, carrying inner portions 76, inside of molding cavities 56 and 58. The outer portions 78 of the twist-on wire connectors 74 are formed at the second molding station 79b. Here, the molding cavities 56 and 58 are formed from separating parts of mold portions 12 and 14 so axial relief requirements are relaxed.

The third molding station 79c, does not in fact provide molding although this could optionally be performed, and is formed by core pins 42, carrying completed twist-on wire connectors 74, inside of cooling cavities 68 and 70. The completed twist-on wire connectors 74 are cooled at the third molding station 79c.

The fourth molding station 79d is formed by core pins 42, carrying cooled-completed twist-on wire connectors 74, exposed outside of the mold portions 12 and 14. The cooled-completed twist-on wire connectors 74 are extracted at the fourth molding station 79d. Parts extractors 80 (not shown) may remove twist-on wire connector 74 from the core pins 42 by twisting them off.

Figure 4:
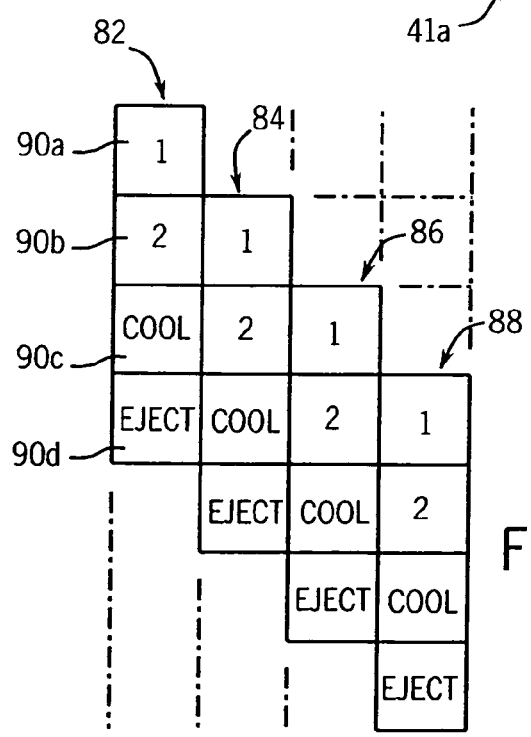
FIG. 4 is a timing diagram showing successive two-shot molding, cooling, and ejecting stages for a molding system in accordance with an embodiment of the present invention.

Referring to FIGS. 3 and 4, the molding of a given twist-on wire connector 74 associated with a given core pin 42 is completed in a four step cycle 82, 84, 86, or 88 comprising the above described steps of a first molding shot step 90a at station 79a, a second molding shot step 90b at station 79b, a cooling step 90c at station 79c and a ejection step 90d at station 79c. As shown in FIG. 4 each cycle 82, associated with a different position 41a-41c on the turrets 38 and 40 is staggered so that at any given time the first injector nozzle 62 injects material through the first runner path 60 to the molding cavities 52 and 54 to form a plurality of inner portions 76 and a second injector nozzle 66 injects material through second runner path 64 into second molding cavities 56 and 58 to form a plurality of outer portions 78.

In between each step 90, mold portion 12 moves away from mold portion 14 and push rods 34 extend to move the turrets 38 and 40 away from mold portions 12 and 14. This removes core pins 42 carrying inner portions 76 from first molding cavities 52 and 54 and core pins 42 carrying inner portions twist-on wire connectors 74 from molding cavities 56 and 58.

Left motor 44 rotates left turret 38 ninety degrees and right turret 40 ninety degrees and push rods 34 retract to move the turrets 38 and 40 towards mold portion 12. Mold portion 12 moves towards mold portion 14 and closes the mold portions together along axis of separation 31.

In the preferred embodiment of the present invention, injection of inner portions 76, injection of second outer portion 78, cooling of twist-on wire connector 74, and ejection of twist-on wire connector 74 occur simultaneously. Cooling could alternatively occur between the first and second shots. Additionally, a third shot of material could be provided by third molding cavities in place of the cooling cavities 68 and 70. In another embodiment of the present invention, parts carriers may not be core pins 42 other mold elements well known in the art.

The above description of an embodiment of the present invention describes two turrets but the injection molding system 10 may have only one turret.

It is specifically intended that the present invention not be limited to the embodiments and illustrations contained herein, but include modified forms of those embodiments including portions of the embodiments and combinations of elements of different embodiments as come within the scope of the following claims.

I claim:
1. An injection molding system comprising:
a turret supporting parts carriers at 90-degree intervals about a longitudinal axis;
a first and second mold portion closing together along a transverse axis substantially perpendicular to the longi- tudinal axis to interfit around the turret when the turret is rotated to any of four positions; and wherein at each of the four positions, the first and second mold portions interfit with at least two parts carriers on the turret that are 90 degrees apart to concurrently form corresponding first and second molding cavities for receiving injected plastic so that one of the first and second molding cavities is formed along an axis of separation defined by direct interaction between the first mold portion and the second mold portion.

2. The injection molding system of claim 1, wherein at least one part carrier at each of the four positions is received by a cooling cavity in at least one of the first and second mold portions.

3. The injection molding system of claim 2, wherein the cooling cavity provides channels for a circulating cooling medium.

4. The injection molding system of claim 1, wherein at least one part carrier at each of the four positions is exposed outside of the first and second mold portions.

5. The injection molding system of claim 4 including a parts extractor engaging and removing at least one part on a part carrier at each of the four positions at which the part carrier is exposed outside of the first and second mold portions.

6. The injection molding system of claim 5 wherein at least one parts carrier at each of the four positions is received by a cooling cavity in at least one of the first and second mold portions.

7. The injection molding system of claim 1, wherein the first molding cavity is formed within the first mold portion only.

8. The injection molding system of claim 1 wherein the second molding cavity is formed within the first and the second mold portions.

9. The injection molding system of claim 8 wherein the first molding cavity is formed within the first mold portion only.

10. The injection molding system of claim 1 wherein the turret supports a plurality of parts carriers spaced about a longitudinal axis at 90-degree intervals.

11. The injection molding system of claim 2 wherein the parts carriers are pins.

12. The injection molding system of claim 1 further including a first and second runner for transporting plastic are formed in the mold portions; wherein the first runner connects to the first molding cavity; and wherein the second runner path connects to the second molding cavity.

13. The injection molding system of claim 1 further comprising a second turret supporting parts carriers spaced at 90-degree intervals about a longitudinal axis;

wherein the longitudinal axis of the second turret is parallel to the longitudinal axis of the first turret;

wherein the first and second mold portions close together along a transverse axis substantially perpendicular to the longitudinal axis of the second turret to interfit around the second turret when the second turret is rotated to any of four positions; and wherein at each of the four positions of the second turret, the mold portions interfit with at least two parts carriers on the second turret separated by 90 degrees to form corresponding third and fourth molding cavities for receiving injected plastic.

14. The injection molding system of claim 13, wherein a direction of rotation of the first turret is opposite to a direction of rotation of the second turret.

15. The injection molding system of claim 13 further including a first and second runner for transporting plastic are formed in one of the mold portions; and wherein the first runner connects to the first and third molding cavities; and wherein the second runner connects to the second and fourth molding cavities.

16. The injection molding system of claim 13, wherein at least two parts carriers of the first and second turrets are received by cooling cavities in at least one of the first and second mold portions at each of the four turret positions.

17. The injection molding system of claim 16, wherein the cooling cavities are in a same mold portion.

18. The injection molding system of claim 13, wherein the second and third molding cavities are along a part line separating the first and second mold portions and wherein the first and fourth molding cavities are wholly in a same one of the first and second mold cavities.

19. The injection molding system of claim 13, wherein at least two parts carriers are exposed on opposite sides of the first and second mold portions outside of the first and second mold portions at each of the four turret positions.

20. The injection molding system of claim 1 wherein the parts carriers are threaded; wherein the first molding cavity forms an inner portion of a twist-on wire connector; and wherein the second molding cavity forms an outer gripping surface of the twist-on wire connector.

* * * * *